(12) United States Patent
Davies et al.

(10) Patent No.: US 7,878,004 B2
(45) Date of Patent: Feb. 1, 2011

(54) METHOD AND DEVICE FOR OPTIMIZING A LIGHT-UP PROCEDURE OF A GAS TURBINE ENGINE

(75) Inventors: Gareth Davies, Coleby (GB); Richard Noden, Maltby (GB); Dorian Skipper, Lincoln (GB); John Wilkinson, Lincoln (GB); Richard Woods, Lincoln (GB)

(73) Assignee: Siemens Aktiengesellschaft, Munich (DE)

( * ) Notice: Subject to any disclaimer, the term of this patent is extended or adjusted under 35 U.S.C. 154(b) by 956 days.

(21) Appl. No.: 11/788,733

(22) Filed: Apr. 20, 2007

(65) Prior Publication Data

US 2007/0245745 A1 Oct. 25, 2007

Related U.S. Application Data

(60) Provisional application No. 60/793,738, filed on Apr. 20, 2006.

(51) Int. Cl.
*F02C 7/22* (2006.01)
*F02C 7/26* (2006.01)

(52) U.S. Cl. .................... 60/778; 60/39.13; 60/790

(58) Field of Classification Search .................. 60/778, 60/39.13, 790
See application file for complete search history.

(56) References Cited

U.S. PATENT DOCUMENTS

| 4,464,895 | A | | 8/1984 | Morrison et al. | |
|---|---|---|---|---|---|
| 5,212,943 | A | * | 5/1993 | Harris | 60/790 |
| 5,748,500 | A | * | 5/1998 | Quentin et al. | 702/182 |
| 5,844,383 | A | | 12/1998 | Denaci | |
| 5,907,949 | A | | 6/1999 | Falke et al. | |
| 6,766,647 | B2 | * | 7/2004 | Hartzheim | 60/778 |
| 7,216,489 | B2 | * | 5/2007 | Uluyol et al. | 60/778 |

FOREIGN PATENT DOCUMENTS

RU  2 078 971 C1  5/1997

* cited by examiner

*Primary Examiner*—Michael Cuff
*Assistant Examiner*—Craig Kim

(57) ABSTRACT

An aspect of the invention is directed towards a method and device for optimizing a light-up procedure of a gas turbine engine. An aspect of the method comprises repeating an engine start attempt with amended light-up parameter values or range of light-up parameter values, where the values are amended by a predefined scheme including recording the light-up parameter value or the range of light-up parameter values of each start attempt together with the light-up success rate achieved in the respective start attempts, and optimizing the light-up parameter value or range of parameter values by analyzing the recorded data after the start attempts have been finished. An aspect of the device is to provide a control unit that implements the inventive method.

7 Claims, 2 Drawing Sheets

METHOD AND DEVICE FOR OPTIMIZING A LIGHT-UP PROCEDURE OF A GAS TURBINE ENGINE

CROSS REFERENCE TO RELATED APPLICATIONS

The present application claims the benefit of the provisional patent application filed on Apr. 20, 2006, and assigned application No. 60/793,738.

FIELD OF INVENTION

The present invention relates to a method and a device for optimizing a light-up procedure of a gas turbine engine.

BACKGROUND OF THE INVENTION

Optimum ignition conditions for gas turbine engines are subject to variation between starts due to a variety of factors, e.g. ambient temperature, gas turbine temperatures, fuel calorific value, fuel content, pressures, repeatability of fuel and air delivery systems, etc. In a typical start system for a gas turbine engine one uses an auxiliary drive unit for driving the turbine and a control unit providing a start sequence in which turbine speed and fuel delivery are coordinated to provide a fuel/air mixture at an ignition device allowing a successful ignition.

In a typical start sequence, the speed of the gas turbine, which is during start driven by an auxiliary motor, and/or the fuel flow to the combustion system are often progressively increased over a set period of time, the so called light-up window. The length of the light-up window is a function of the range of engine speeds at which starting is most likely to occur, typically between 5% and 20% of the rated engine speed and the accumulation rate of fuel in the combustor. During the light-up window a number of ignition opportunities appear, the actual number of which depends on the number of sparks that can be delivered per second by the igniter of the gas turbine engine and the length (duration) of the light-up window. Therefore one likes to have the light-up window as long as possible. However, the length of the light-up window is delimited by a number of factors. If, e.g. the turbine is accelerated too quickly the fuel injection system will not have enough time to provide a sufficient amount of fuel before the window of engine speeds at which starting is most likely to occur is exceeded. On the other hand, if the turbine is accelerated too slowly, it may happen that an amount of fuel inside the combustor is reached which could be dangerous to the engine while the turbine speed has still not reached the maximum speed within the light-up window.

For example the acceleration rate of the turbine depends on the ambient conditions. On a cold day, a battery driven starter motor may not be capable of accelerating the engine quickly due to possible low power supply. On the other hand, on a very hot day, the same motor with the same battery may be capable of accelerating the engine very quickly. To cope with the mentioned limitations a compromise is typically required between maximizing the light-up window to cover for wide variations in the actual optimum window and minimizing the variation rate to increase the number of ignition opportunities (sparks) during the actual optimum window, without establishing a potentially dangerous fuel amount inside the combustion system during the light-up window.

Typical start sequences for gas turbine engines are, e.g. described in U.S. Pat. No. 5,844,383, U.S. Pat. No. 5,907,949, where a temporary increase in fuel flow during start to enhance the heat release is described, U.S. Pat. No. 4,464, 895, where a pulsating (modulated) liquid fuel flow which improves the atomization and thereby the ignition capability is described, and in RU 2078971, where the fuel flow is varied in relation to the operating condition for the gas turbine before start.

If a successful ignition cannot be detected after the light-up window, the gas turbine is usually shut down due to a so called "no-light-up trip". Such "no-light-up trips" are time consuming.

To minimize the probability of a "no-light-up trip" one tries to optimize the settings to be used during start ups. To do so it is necessary to know where the actual limits are for successful light-up. This is currently typically achieved during commissioning/service periods by manually mapping out the light-up window, i.e. the parameter window in which ignition is most likely to occur, e.g. by altering the fuel and/or speed demand settings and monitoring/recording the success rate at a number of set values. This can be time consuming and has a risk that the settings may be entered or left incorrectly.

SUMMARY OF INVENTION

It is therefore an objective of the present invention to provide a method and a device for optimizing a light-up procedure of a gas turbine engine which overcomes or at least reduces the mentioned difficulties.

This objective is solved by a method as claimed in the claims and by a control device as claimed in the claims. The depending claims define further developments of the invention.

According to a first aspect of the invention a method of optimizing a light-up procedure for starting a gas turbine engine includes a start attempt, in which at least one light-up parameter is set to a parameter or varied within a range of parameter values at which light-up (i.e. starting of the gas turbine engine) is expected to occur. The start attempt is repeated with the light-up parameter value or the range of light-up parameter values being amended. The amendment of the light-up parameter value or the range of light-up parameter values follows a predefined scheme. The light-up parameter value or the range of light-up parameter values of each start attempt are recorded together with the light-up success rate achieved in the respective start attempts. An optimized light-up parameter value or an optimized range of parameter values is provided by analyzing the recorded data after the start attempts have been completed.

According to a second aspect of the inventive method, the light-up procedure for starting a gas turbine engine is optimized. The light-up procedure includes a start attempt, in which at least one light-up parameter is set to a parameter value or varied within a range of parameter values at which light-up is expected to occur. The start attempt is repeated with at least one light-up parameter value or the range of light-up parameter values being amended if successful light-up has not occurred by the end of the start attempt. Before the at least one light-up parameter value or the range of light-up parameter values is amended at least one preceding start attempt is analyzed and the amendment of the light-up parameter value or the range of light-up parameter values is made dependent on the result of the analysis.

When the at least one light-up parameter is varied within a range of parameter values the range of parameter values can be amended by shifting and/or scaling. Typical light-up parameters are those turbine parameters which influence the light-up possibility. In particular those parameters comprising the fuel/air ratio of a fuel/air mixture at an ignition device of a gas turbine engine and the turbine speed.

With the inventive method according to the first aspect of the invention it becomes possible to automatically optimize the start up windows, i.e. providing parameter ranges for one or more light-up parameters for which light-up is most likely to occur, after a sequence of start attempts has been executed. With the second aspect of the inventive method it becomes possible to determine a new light-up parameter value or a new range of light-up parameter values for a start attempt in a sequence of start attempts by analyzing one or more preceding start attempts. Thus, the information resulting from the preceding, unsuccessful start attempts can be used for setting optimized parameters in the actual start attempt. With this second aspect of the inventive method, one even may achieve quicker successful light-up than with the methods using a predetermined scheme for amending the at least one light-up parameter.

Between two start attempts the engine may be purged so that the fuel/air mixture present in the engine from the preceding start attempt is blown out of the engine. This helps to prevent the build up of possibly dangerous fuel/air mixing ratios in the engine.

Preferably, repeating start attempts stops if a predetermined stop condition is reached or a successful ignition is detected.

An inventive control unit for performing a light-up procedure of a gas turbine engine is adapted to execute the inventive method according to the first and the second aspect and comprises a window generator, a processor unit, an ignition monitor, a recording unit and an analyzer. The window generator is adapted to generate a window signal representing the at least one light-up parameter value or a range of light-up parameter values for the at least one light-up parameter at which starting is expected to occur. The processor unit is connected to the window generator for receiving the window signal and adapted to execute a start attempt for the gas turbine engine and to set the at least one light-up parameter to the light-up parameter value or to vary the at least one light-up parameter within the range of light-up parameter values defined by the window signal. The ignition monitor is adapted to monitor the success of a start attempt and to generate a success signal representing the degree of success of ignition after the start attempt has finished. The degree of success can, e.g., be expressed by the number of combustors with successful ignition if the gas turbine engine comprises more than one combustor. A successful light-up would then be an ignition of all combustors. In addition to being connected to the window generator, the processor unit is also connected to the ignition monitor. Moreover, it is further adapted to initiate another start attempt when the success signal indicates that light-up was not successful. The recording unit is connected to the window generator for receiving the window signal and to the ignition monitor for receiving the success signal. It is adapted to record the light-up parameter value or the range of light-up parameter values of the at least one light-up parameter in a start attempt together with the achieved ignition success rate of this start attempt. The analyzer, which may be the processor unit or an additional unit which may either be a stand alone unit or be integrated into any other unit, is connected to the recording unit for reading the recorded light-up parameter values or the recorded ranges of light-up parameter values of the at least one light-up parameter and the recorded ignition success rates. It is adapted to analyze the read light-up parameter value or ranges of light-up parameter values and the read ignition success rate of at least the preceding start attempt and to provide an optimized light-up parameter value or an optimized range of light-up parameter values for the at least one light-up parameter.

In a further development of the inventive control unit the window generator is connected to the analyzer for receiving the optimized light-up parameter value or the optimized range of light-up parameter values for the at least one light-up parameter. Moreover, the window generator is adapted to establish the light-up parameter value or the range of light-up parameter values for the at least one light-up parameter by matching it to the optimized light-up parameter value or the optimized range of light-up parameter values, respectively. This development of the inventive control unit allows, in particular, for executing the inventive method according to the second aspect of the inventive method.

BRIEF DESCRIPTION OF THE DRAWINGS

Further features, properties and advantages of the present invention will become clear from the following description of embodiments in conjunction with the accompanying drawings.

DETAILED DESCRIPTION OF INVENTION

Figure 1:
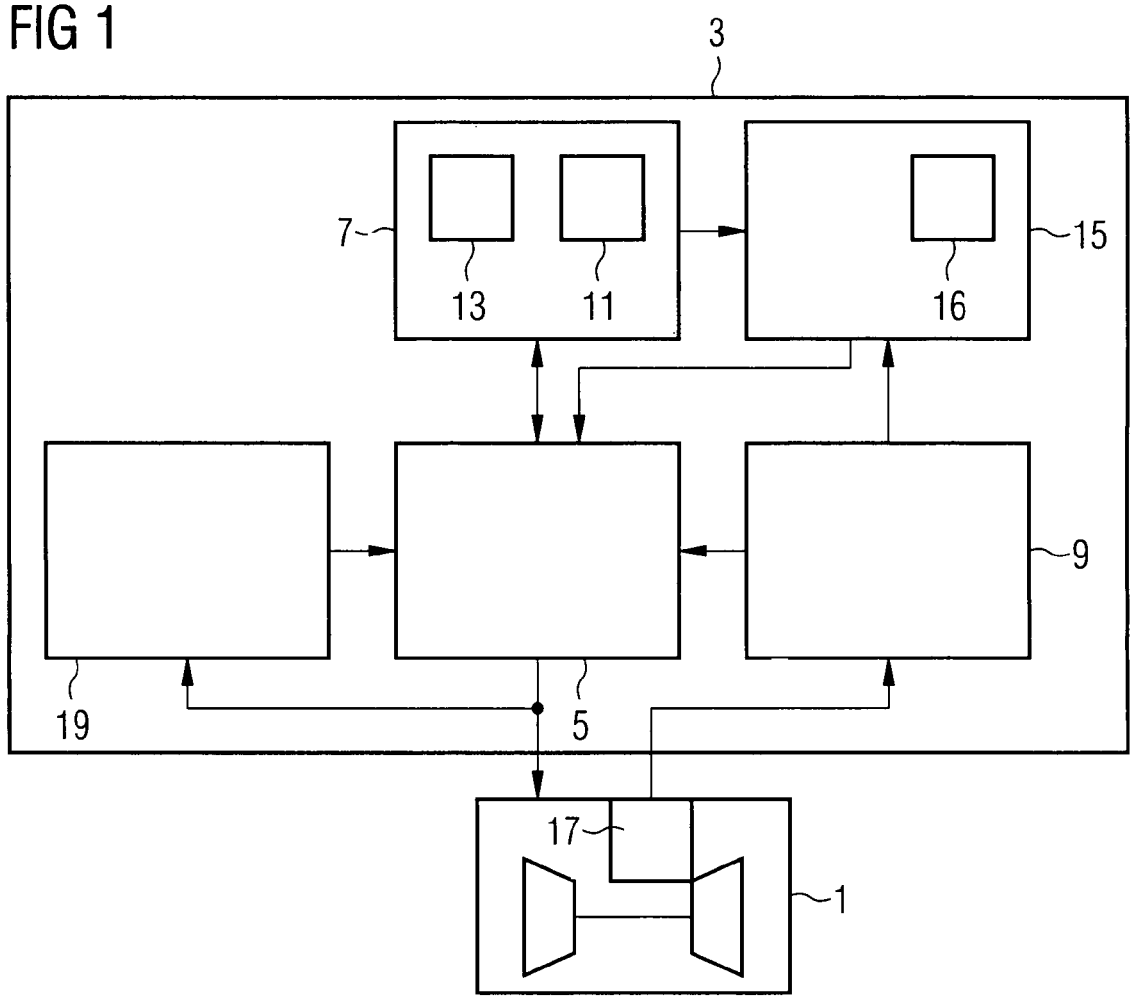
FIG. 1 shows a control unit according to a first embodiment of the present invention.

A first embodiment of the inventive control device 3 for performing a light-up procedure for a gas turbine engine 1 and a first embodiment of the method of optimising the light-up procedure will be described with respect to FIGS. 1 and 2. The control device 3 of the first embodiment, shown in FIG. 1, comprises a processor unit 5, a parameter window generator 7, an ignition monitor 9, a counter 19 and a recording unit 15 including a memory unit 16. The parameter window generator 7 includes a shifting unit 11 and a scaling unit 13. All units of the control device 3 may be implemented as hardware or software. Although the memory unit 16 is in the present embodiment shown to be included in the recording unit 15 it may as well be a separate unit connected to the recording unit 15.

The processor unit 5 is connected to the gas turbine engine 1. It is adapted to begin and control a start attempt in order to light-up the engine 1. During the start attempt, the turbine speed and the fuel to air ratio represent light-up parameters which are ramped up within respective parameter windows of turbine speeds and fuel to air ratios. The parameter windows are defined by starting and end points for the ramps and a linear variation between these points. The fuel to air ratio may be varied by a fuel flow command defining a certain fuel flow for a given turbine speed since the turbine speed also determines, via a compressor which is connected to the turbine, the air flow through the combustion system. The processor unit 5 receives the actual parameter windows for the start attempt from the window generator 7. In addition, the actual parameter windows are also received by the recording unit 15 which is connected to the window generator 7 and which stores the parameters windows.

The processor unit 5 is further connected to the ignition monitor 9 which outputs a success signal representing the degree of success of light-up. To detect the success of light-up the ignition monitor 9 is connected to one or more ignition detectors 17 in the gas turbine engine 1. Advantageously the ignition detector(s) is/are able to individually detect ignition at every single combustor of the gas turbine. A light-up is said to be successful when ignition was successful at all combustors. The fewer combustors which are successfully ignited the lower the degree of success of light-up.

The recording unit 15 is also connected to the ignition monitor 9 for receiving and storing the success signal in the memory unit and to relate it to the used window parameters.

The processor unit 5 is adapted to generate a purging signal if it receives a success signal from the ignition monitor 9 which represents a failure of ignition, i.e. ignition was not successful at all combustors. The purging signal is then output to the gas turbine engine 1 and causes the engine to stop fuel delivery but to continue with delivery of air. Hence, excess fuel accumulated in the engine is blown out of the engine so that after the purging no potentially dangerous fuel-to-air ratio is present in the engine. After purging the engine the processor unit 5 requests a new parameter windows from the window generator 7 for another start attempt.

For a new start attempt, the shifting unit 11 of the window generator 7 shifts the range of turbine speeds and/or fuel to air ratios of the parameter window(s). Additionally or alternatively, the scaling unit 13 multiplies the range of turbine speeds and/or fuel to air ratios of the parameter window(s) by a scaling factor. In the present embodiment, the shifting and/or scaling follows a predetermined scheme.

Although, in the present embodiment, a shifting unit 11 and a scaling unit 13 are present, the window generator 7 could, in principle, be equipped with a shifting unit 11 or a scaling unit 13, only. As a further alternative, which is not realized in the present embodiment, the light-up parameters, i.e. the turbine speed and/or fuel to air ratio could be held constant during a start attempt. The start attempt would then only mean providing a number of sparks within a given period of time in order to ignite the fuel/air mixture.

Before the new start attempt is initiated in the present embodiment by the processor unit 5, the new parameter window(s), which is/are shifted and/or scaled with respect to preceding parameter window(s), is/are output to the processor unit 5. After receiving the new parameter window(s) the processor unit 5 starts the new starting attempt. The new parameter window(s) is/are also recorded by the recording unit 15.

With the new parameter window(s) a further start attempt is executed and the rate of success is monitored by the ignition monitor 9. After the start attempt the success signal provided by the ignition monitor 9 is recorded by the recording unit 15 and related to the actual parameter window(s).

Start attempts, as well as recording parameter windows and success signals, are repeated until either a predetermined number of successive failed light-ups has occurred following at least one successful light-up or a maximum number of start attempts has been counted. Each purging signal output by the processor unit 5 to the gas turbine engine 1 is also received by a software or hardware counter 19. Upon receiving a purging signal the counter counts up, and when a maximum count number is reached a stop signal is output from the counter 19 to the processor unit 5. The stop signal causes the processor unit 5 not to continue with the output of purging signals and to output a shut down signal to the gas turbine engine 1.

After the start attempts are finished, the processor unit 5 analyses the start attempts according to the achieved degree of ignition with the relating parameter window(s). The parameter window(s) by which the highest degree of ignition (which may be, but does not necessarily need to be, successful light-up) is achieved is/are designated as being the optimised light-up window(s) and stored and/or output to an operator for later light-up attempts.

Figure 2:
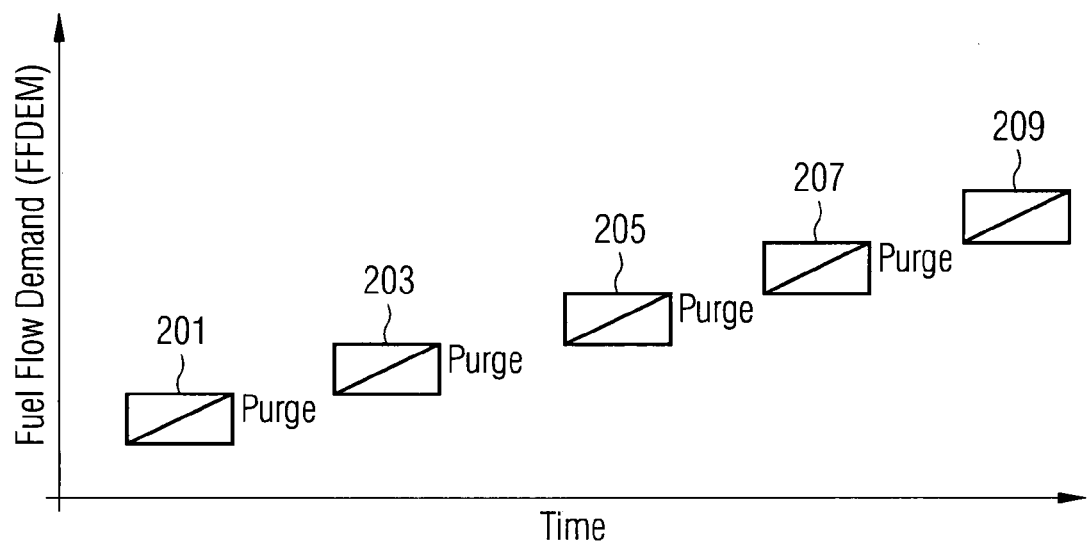
FIG. 2 shows a typical sequence of start attempts for the first embodiment.

A typical sequence of parameter windows for a number of start attempts and purging of the gas turbine engine 1 according to the first embodiment is schematically shown in FIG. 2. The Figure shows a fuel flow demand as a function of time. Within a parameter window 201 to 209 the fuel flow is ramped up which is indicated by the diagonal line in each window 201 to 209. The fuel flow demand can be adapted to the rotation speed of the gas turbine engine either so as to provide a fixed fuel/air ratio during a start-up window or so as to provide an increasing fuel/air ratio. During each window, which typically lasts for 2 to 10 seconds, a number of sparks is provided by an ignition system in order to achieve light-up. The shifting of the parameter windows from one start attempt to another follows a fixed predetermined scheme in the present embodiment.

To summaries, the operating philosophy of the first embodiment can be described by the following steps:
1. Engine starts up and runs up to ignition phase;
2. Ignition speed is held constant;
3. Igniters switched on;
4. Fuel flow demand is set at the lowest value;
5. Fuel is switched on at fuel flow demand value for set number of seconds;
6. Light-up data (success rate, but also further information, e.g., times, flows etc.) is recorded for each combustor;
7. A purge sequence is performed for a pre-given time period with fuel and igniters switched off;
8. The fuel flow demand setting is increased by a predetermined stepped amount;
9. Steps 5 to 8 are repeated until the predetermined number of successive failed light-up (e.g. $\geq 1$ combustors failed to have been ignited) have occurred following successful light-ups (e.g. at upper window values);
10. Stop mapping of windows and shut down;
11. Display the result of the window mapping procedure.

Figure 3:
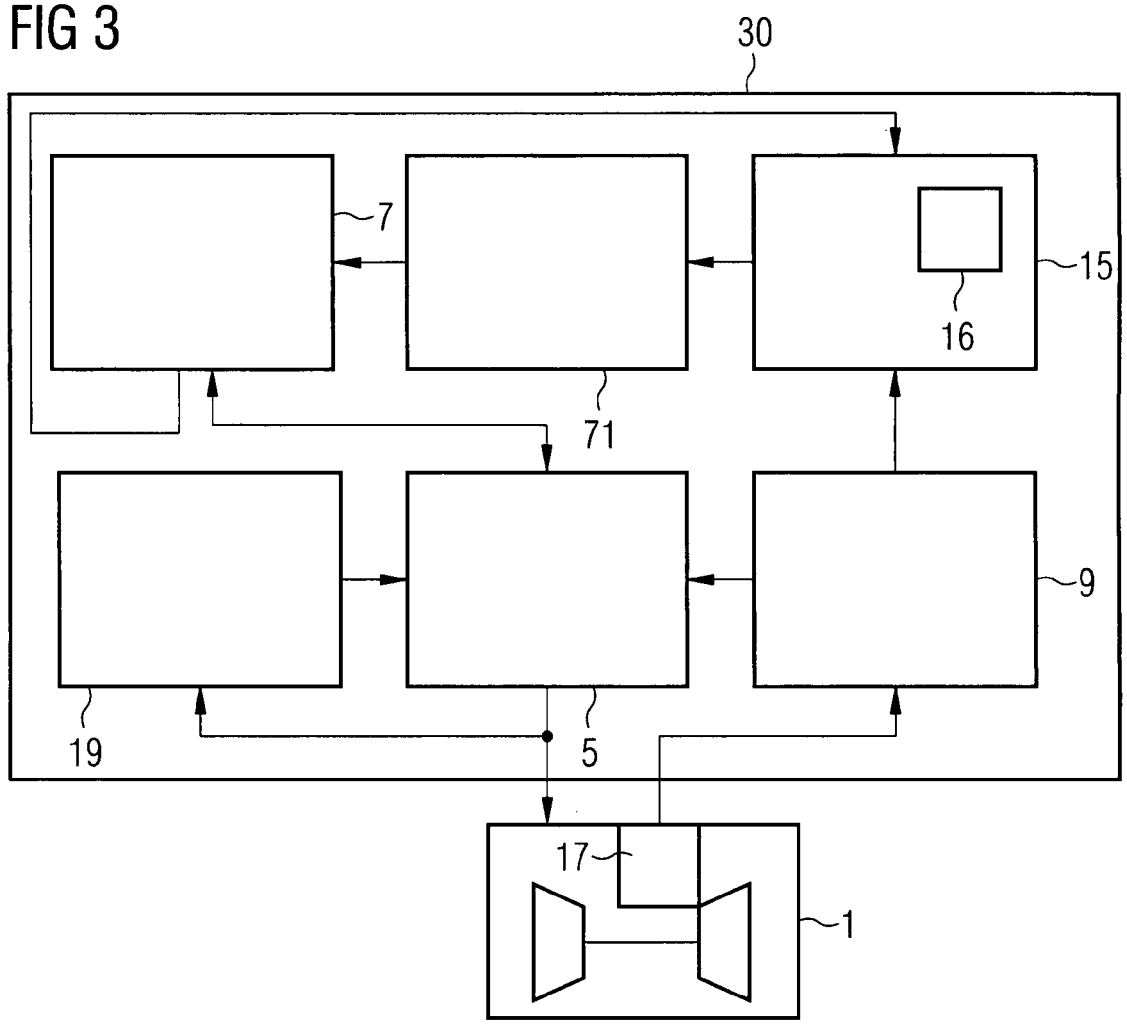
FIG. 3 shows a second embodiment of the control unit according to the present invention.

A second embodiment of the inventive control device for performing a light-up procedure for a gas turbine engine 1 and a second embodiment of the method of optimizing the light-up procedure will now be described with respect to FIGS. 3 and 4. The control device 30, according to the second embodiment, comprises a processor unit 5, a parameter window generator 7, an analyzer 71, an ignition monitor 9, a counter 19 and a recording unit 15. The processor unit, the parameter window generator 7, the ignition monitor 9, the recording unit 15 and the counter 19 correspond to those of the first embodiment and will therefore not be described again with respect to the second embodiment.

The second embodiment of the inventive control device 30 differs from the first embodiment in that an analyzer 71 is present which is connected to the recorder 15 for reading out the data stored in its memory unit 16. It is further connected to the window generator 7 for giving out optimized values or an optimized range of values for which ignition is most likely expected to occur.

Each parameter window given out to the control unit 5 by the window generator 7 is recorded by the recording unit 15 and stored in the memory unit 16. In addition, after the start attempt based on a parameter window the success rate of the start attempt is recorded by the recording unit 15, related to the parameter window on the basis of which the start attempt has been executed and stored in the memory unit 16.

Unlike in the first embodiment, analysis of the recorded data does not only take place after a whole sequence of start attempts has been performed, but after each start attempt. After a purging signal has been emitted by the control unit 5 a new parameter window is generated by the window generator 7 for the next start attempt. However, the generation of the parameter window differs from the first embodiment in that the analyzer 71 reads the data stored in the memory unit 16, i.e. the data relating to the preceding start attempts, and analyses the data in view of the parameter windows in the preceding start attempts produced the highest success rate for light-up, i.e. which parameter windows led to the highest number of combustors with successful ignition. On the basis of this analysis, the analyzer generates an optimized parameter window, i.e. in the present embodiment an optimized parameter window for the turbine speed and an optimized parameter window for fuel/air ratio of the fuel/air mixture. The optimized values for the parameter windows are then given out to the window generator 7 which generates a window signal representing the values for the parameter windows provided by the analyzer 71.

The optimizing may, e.g., be done by looking at tendencies in the success rate as a function of the parameter windows in the preceding start attempts. If a shift of a parameter window in a certain direction has led to an increase of ignition rate throughout the preceding start attempts, the optimized parameter window may be shifted further in this direction until the success rate of light-up does not increase further or even reduces. However, more sophisticated algorithms for finding an optimized parameter range can be used as well.

Figure 4:
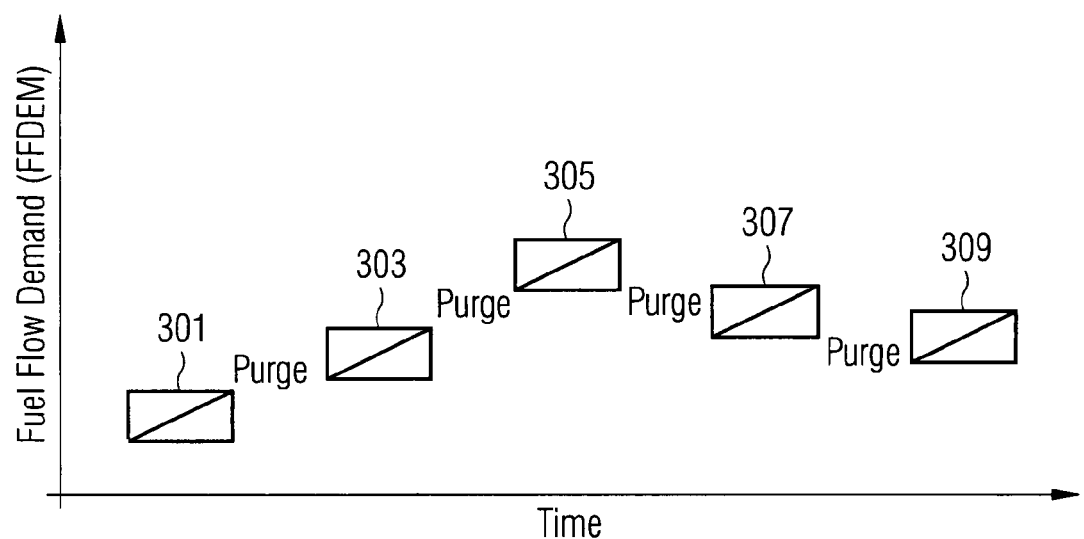
FIG. 4 shows a sequence of start up windows according to the second embodiment.

In order to prevent the analyzer 71 from being trapped at a certain "optimized" parameter window which does not lead to a successful light-up one could include a randomizing unit into the analyzer which randomly shifts the parameter window within a predefined range if the parameter window(s) has/have not been shifted for two or more start attempts A typical sequence of parameter windows for a number of start attempts and purging of the gas turbine engine according to the second embodiment is schematically shown in FIG. 4. As in FIG. 2, this figure shows the fuel flow demand as a function of time. Within a parameter window 301 to 309 the fuel flow is ramped up which is indicated by the diagonal line in each window 301 to 309. The fuel flow demand can be adapted to the rotation speed of the gas turbine engine either to provide a fixed fuel/air ratio during start up window or so as to provide an increasing fuel/air ratio. During each window, which typically lasts for two to ten seconds, a number of sparks are provided by an ignition system in order to achieve light-up.

After the first start attempt has been performed, the success rate achieved by the parameter window 301 is recorded by the recording unit 15. Then, after purging the gas turbine engine 1, the parameter window is shifted towards a higher fuel flow-demand (parameter window 303). An analysis of the first parameter window 301 and the success rate achieved with it does not necessarily need to be performed in this step. After the start attempt based on the second parameter window 303 has been executed the analyzer 71 analyses the parameter windows 301 and 303 in view of the success rate of ignition achieved by them. In the example shown in FIG. 4, the success rate was found to be higher for the parameter window 303 than for the parameter window 301. Therefore, the analyzer outputs an optimized range of parameter values for the parameter window for which the success rate is expected to be higher than for the parameter window 303. This parameter range describes, in the embodiment shown in FIG. 4, an even higher fuel flow demand than the parameter ranges of the preceding windows. The window generator 7 then outputs a window signal to the control unit 5 representing the parameter window 305.

After the start attempt based on the parameter window, 305 has been performed the success rate, as achieved by this parameter window, is stored again. In the present example, the success rate has been found to be lower than the success rate achieved with the parameter window 303. As a consequence, the analyzer outputs a new optimized parameter range for the parameter window which is shifted towards the parameter range present in the parameter window 303. However, the step width of the shifting is reduced compared to the step width of the preceding shifting. This means that the new parameter window 307 lies in between the values of the parameter windows 303 and 305.

In the present embodiment still no success light-up has been detected after the start attempt based on the parameter window 307 has been performed. However, the success rate has been higher than for the parameter window 305 and higher than for the parameter window 303. Then the analyzer provides a new optimized parameter range which is further shifted towards the parameter range which was present in the parameter window 303. With the parameter window 309 based on the optimized range of parameter values a successful light-up attempt has been performed. Then, the method stops and stores the parameter window 309 as the optimized parameter window. If, after shut down of the gas turbine engine, a new start up is performed, the parameter window 309 can be used as initial parameter window unless the ambient conditions have been changed so much that it is not to be expected that the parameter window 309 would be optimized any more.

Although the first and second embodiments have been described with ramping up one or more start up parameters, the start up parameters could also be kept constant during a start attempt. The start attempt would then only be providing a number of sparks for a fixed set of parameters.

Although not explicitly described throughout this specification, further input data could be used to determine the optimized parameter values or the optimized ranges of parameter values. Such further data could be design data or data relating to the ambient conditions where the gas turbine engine is located.

The invention claimed is:

1. A control unit for optimizing a light up procedure of a gas turbine engine, comprising:
   a window generator generates a window signal representing a light-up parameter value or a range of light-up parameter values at which starting is expected to occur for at least one light-up parameter;
   a processor unit connected to the window generator for receiving the window signal, and adapted to execute a start attempt for the gas turbine engine and to set the light-up parameter to the light-up parameter value or to vary the light-up parameter within the range of light-up parameter values defined by the window signal;
   an ignition monitor for monitoring the success of a start attempt adapted to generate a success signal representing the degree of success of ignition after the start attempt has finished;
   a recording unit connected to the window generator for receiving the window signal and to the ignition monitor for receiving the success signal, the recording unit adapted to record the light-up parameter value or the range of light-up parameter values of the at least one light-up parameter in a start attempt together with the achieved ignition success rate of this start attempt; and
   an analyzer connected to the recording unit for reading the recorded light-up parameter values or the recorded ranges of light-up parameter values of the at least one light-up parameter and the recorded ignition success rates,
   wherein the processor unit is connected to the ignition monitor and further adapted to initiate another start attempt when the success signal indicates that light-up was not successful, and wherein the analyzer is adapted to analyze the read light-up parameter values or ranges of light-up parameter values and the read ignition success rates of at least the preceding start attempt and to provide an optimized light-up parameter value or an optimized range of light-up parameter values for the at least one light-up parameter.

2. The control unit as claimed in claim 1, wherein the window generator is connected to the analyzer for receiving the optimized light-up parameter value or the optimized range of light-up parameter values for the at least one light-up parameter and being adapted to establish the light-up parameter value or the range of light-up parameter values for the at least one light-up parameter by matching it to the optimized light-up parameter value or the optimized range of light-up parameter values, respectively.

3. The method as claimed in claim 1, wherein at least one light-up parameter is varied within a range of parameter values and in which the range of parameter values is amended by shifting and/or scaling.

4. The method as claimed in claim 1, wherein at least one light-up parameter is the turbine speed.

5. The control unit as claimed in claim 1, wherein at least one light-up parameter is a fuel/air ratio of a fuel/air mixture at an ignition device.

6. The control unit as claimed in claim 1, wherein start attempts are stopped if a predetermined stop condition is reached or a successful ignition is detected.

7. The control unit as claimed in claim 1, wherein the gas turbine engine is purged between two start attempts.

* * * * *